United States Patent [19]

Kashihara

[11] Patent Number: 5,584,036
[45] Date of Patent: Dec. 10, 1996

[54] PROCESS MANAGEMENT APPARATUS AND METHOD FOR A PREPRESS PROCESS STORING PROGRESS STATUS DATA SEGMENTED INTO JOB UNITS AND PROCESS STEPS OF JOB PROGRESS

[75] Inventor: Hideaki Kashihara, Kyoto, Japan

[73] Assignee: Dainippon Screen Mfg. Co., Ltd., Kyoto, Japan

[21] Appl. No.: 518,623

[22] Filed: Aug. 23, 1995

Related U.S. Application Data

[63] Continuation of Ser. No. 298,288, Aug. 31, 1994, abandoned.

[30] Foreign Application Priority Data

Sep. 22, 1993 [JP] Japan .................................. 5-235318

[51] Int. Cl.$^6$ ................................................ G06F 3/12
[52] U.S. Cl. .................. 395/800; 395/497.04; 395/101; 395/183.01; 395/418
[58] Field of Search .............................. 395/800, 497.04, 395/418, 100

[56] References Cited

U.S. PATENT DOCUMENTS

| | | | |
|---|---|---|---|
| 4,300,192 | 11/1981 | Couleur et al. ......................... | 395/480 |
| 4,682,286 | 7/1987 | Yamada ................................... | 395/800 |
| 5,018,060 | 5/1991 | Gelb et al. .............................. | 395/600 |
| 5,058,113 | 10/1991 | Burnham et al. ................... | 395/183.01 |
| 5,079,738 | 1/1992 | Bockenfeld ............................ | 395/800 |
| 5,303,144 | 4/1994 | Kawashima ............................ | 364/401 |
| 5,367,673 | 11/1994 | Goldsmith et al. ..................... | 395/600 |
| 5,428,747 | 6/1995 | Kitamoto ................................ | 395/821 |

Primary Examiner—Tod R. Swann
Assistant Examiner—Denise Tran
Attorney, Agent, or Firm—Lowe, Price, LeBlanc & Becker

[57] ABSTRACT

Progress status data from each of apparatuses is read by the communication apparatus 48, and provided to the reading and registration apparatus for progress information 52. In the reading and registration apparatus for progress information 52, the progress status data is segmented into for each pages, and stored in independent memory area in the progress management master file on the disk 53. In the similar manner, the progress status data is segmented for each process steps and stored in the independent memory area in the progress management master file. Therefore, it is not necessary to seek both for each pages and for each process steps when management is carried out by displaying the progress status, so that prompt processing can be realized. Although connecting many of the apparatuses when grasp of progress status, speed of processing does not decrease.

6 Claims, 21 Drawing Sheets

FIG. 3 BLOCK DIAGRAM OF PREPRESS SYSTEM

BLOCK DIAGRAM OF EQUIPMENT APPARATUS 40

FIG. 6 PROCESSING AT THE MANAGEMENT APPARATUS 42

FIG. 9

CONSTRUCTION OF
JOB MASTER FILE, 56:Job_Mstr_File

| ITEM (INDEX) | CONTENTS |
|---|---|
| Order_# | ORDER NO. |
| Mgmnt_# | MANAGEMENT NO. |
| Date | DATE |
| Job_ID | WORK JOB ID NO. |
| Book_ID | BOOK LEVEL ID NO. |
| Book_Inf. | NAME, SIZE ETC |
| Page_Grp_ID | PAGE GROUP ID NO. |
| Grouping Page Inf. | INCLUDING PAGES |
| Page_ID | PAGE ID NO. |
| Page Inf. | NAME, SIZE ETC |
| Parts_ID | PARTS ID NO. |
| Parts Inf. | NAME, SIZE ETC |

FIG. 10

CONSTRUCTION OF
PARTS DATA MASTER FILE57:Parts_Data_Mstr_File

| Parts_ID | Parts_Data address | parts data |
|---|---|---|
| text-126 | 100012 | img -224 |
| line-100 | 436700 | text-126 |
| text-245 | 23457 | img -344 |
| img -224 | 67 | text-245 |
| img -344 | 2334678 | line-100 |

FIG. 11

CORRESPONDENCE TABLE FOR SOFTWARE ID NO. AND OF SOFTWARE

| SOFTWARE ID NO. | SOFTWARE NAME |
|---|---|
| 1 | WORD PROCESSER |
| 200 | COLOR CORRECTION |
| 300 | IMAGE COMBINE |
| 400 | PAGE MAKE-UP |
| 15 | DATA CONVERSION |
| 500 | CUT OUT |
| 700 | BRUSHING |
| 800 | LINE WORK CREATION |
| 93 | DATA EXPANSION |

CORRESPONDENCE TABLE FOR HARDWARE ID NO. AND NAME OF APPARATUS

| HARDWARE ID NO. | APPARATUS NAME |
|---|---|
| 1 | SCANNER |
| 2 | WS-#1 |
| 12 | WS-#2 |
| 67 | WS-#3 |
| 5 | RIP-1 |
| 6 | RIP-2 |
| 7 | RIP-3 |
| 8 | PROOFREAD |

CORRESPONDENCE TABLE FOR HARDWARE ID NO. AND SOFTWARE ID NO.

| HARDWARE ID NO. | SOFTWARE ID NO. |
|---|---|
| 1 | 1 |
| 2 | 200 |
| 2 | 300 |
| 12 | 1 |
| 12 | 500 |
| 12 | 800 |
| 67 | 400 |
| 67 | 700 |
| 6 | 15 |
| 6 | 93 |

FIG. 14   CONSTRUCTION OF PROGRESS STATUS DATA

- STX(Start of Text) : ID CODE FOR STARTING DATA TRANSMISSION
- DETA# : NUMBER OF DATA TRANSMISSION
- Order_No : ORDER NO
- Management_No : MANAGEMENT NO.
- Job_ID : WORK JOB ID NO.
- Page_ID : PAGE ID NO.
- Parts_ID : PARTS ID NO.
- H/W_ID : TRANSMITTED HARDWARE ID NO.
- S/W_ID : TRANSMITTED SOFTWARE ID NO.
- CMD_Code : COMMAND CODE ; (eg) START OPERATION
- Operator_ID : OPERATOR ID CODE
- Time : TIME ON CHANGE OCCURING
- EOD(End of Data) : ID CODE FOR END OF DATA TRANSMITTED

FIG. 16

EXAMPLE OF PROGRESS STATUS DATA
RECEIVED AT MANAGEMENT APPARATUS 42

| Order_No | Mgmnt_No | Job_ID | Page_ID | Part_ID | HD_ID | SW_ID | CMD_Code | Optr_ID | TIME |
|---|---|---|---|---|---|---|---|---|---|
| 100 | 10001 | 1 | 2 | 12 | 12 | 01 | START  :01 | 0212 | 93/7/26/2:24:00 |
| 100 | 10001 | 1 | 2 | 12 | 12 | 01 | INTRPT :02 | 0212 | 93/7/26/2:28:30 |
| 200 | 10002 | 2 | 43 | 30 | 2 | 15 | START  :01 | 0150 | 93/7/26/2:28:35 |
| 100 | 10001 | 1 | 2 | 12 | 12 | 01 | INTRPT :03 | 0212 | 93/7/26/2:29:00 |
| 200 | 10002 | 2 | 44 | 2 | 1 | 1 | START  :01 | 90 | 93/7/26/2:29:35 |
| 100 | 10001 | 1 | 2 | 12 | 12 | 01 | INTRPT :02 | 0212 | 93/7/26/2:31:30 |
| 200 | 10002 | 2 | 43 | 30 | 2 | 15 | COMPLT :04 | 0150 | 93/7/26/2:39:01 |
| 100 | 10001 | 1 | 2 | 12 | 12 | 01 | RESTART:03 | 0212 | 93/7/26/2:40:00 |
| 100 | 10001 | 1 | 2 | 12 | 12 | 01 | COMPLT :04 | 0212 | 93/7/26/2:50:14 |
| 200 | 10002 | 2 | 44 | 2 | 1 | 1 | COMPLT :04 | 90 | 93/7/26/2:51:08 |
| 100 | 10001 | 1 | 2 | 13 | 67 | 93 | START  :01 | 0213 | 93/7/26/3:01:00 |
| 100 | 10001 | 1 | 2 | 13 | 67 | 93 | COMPLT :04 | 0213 | 93/7/26/3:10:00 |
| 100 | 10001 | 1 | 2 | 14 | 12 | 50 | START  :01 | 0214 | 93/7/26/3:23:00 |
| 200 | 10002 | 2 | 43 | 31 | 1 | 01 | START  :01 | 100 | 93/7/26/3:24:14 |
| 100 | 10001 | 1 | 2 | 14 | 12 | 50 | COMPLT :04 | 0214 | 93/7/26/3:33:00 |
| 200 | 10002 | 2 | 43 | 31 | 1 | 01 | COMPLT :04 | 100 | 93/7/26/3:40:00 |

FIG. 17

INDEPENDENT MEMORY FOR EACH PAGES (JOB_ID:1, PAGE_ID:2)

| Order_No | Mgmnt_No | Job_ID | Page_ID | Part_ID | HD_ID | SW_ID | CMD_Code | Optr_ID | TIME |
|---|---|---|---|---|---|---|---|---|---|
| 100 | 10001 | 1 | 2 | 12 | 12 | 01 | START  :01 | 0212 | 93/7/26/2:24:00 |
| 100 | 10001 | 1 | 2 | 12 | 12 | 01 | INTRPT :02 | 0212 | 93/7/26/2:28:30 |
| 100 | 10001 | 1 | 2 | 12 | 12 | 01 | RESTART:03 | 0212 | 93/7/26/2:29:00 |
| 100 | 10001 | 1 | 2 | 12 | 12 | 01 | INTRPT :02 | 0212 | 93/7/26/2:31:30 |
| 100 | 10001 | 1 | 2 | 12 | 12 | 01 | RESTART:03 | 0212 | 93/7/26/2:40:00 |
| 100 | 10001 | 1 | 2 | 12 | 12 | 01 | COMPLT :04 | 0212 | 93/7/26/2:50:14 |
| 100 | 10001 | 1 | 2 | 13 | 67 | 93 | START  :01 | 0213 | 93/7/26/3:01:00 |
| 100 | 10001 | 1 | 2 | 13 | 67 | 93 | COMPLT :04 | 0213 | 93/7/26/3:10:00 |
| 100 | 10001 | 1 | 2 | 14 | 12 | 50 | START  :01 | 0214 | 93/7/26/3:23:00 |
| 100 | 10001 | 1 | 2 | 14 | 12 | 50 | COMPLT :04 | 0214 | 93/7/26/3:33:00 |

FIG. 18 INDEPENDENT MEMORY FOR EACH PAGES (JOB_ID:2, PAGE_ID:43)

| Order_No | Mgmnt_No | Job_ID | Page_ID | Part_ID | HD_ID | SW_ID | CMD_Code | Optr_ID | TIME |
|---|---|---|---|---|---|---|---|---|---|
| 200 | 10002 | 2 | 43 | 30 | 2 | 15 | START :01 | 0150 | 93/7/26/2:28:35 |
| 200 | 10002 | 2 | 43 | 30 | 2 | 15 | COMPLT:04 | 0150 | 93/7/26/2:39:01 |
| 200 | 10002 | 2 | 43 | 31 | 1 | 01 | START :01 | 100 | 93/7/26/3:24:14 |
| 200 | 10002 | 2 | 43 | 31 | 1 | 01 | COMLT :04 | 100 | 93/7/26/3:40:00 |

FIG. 19 INDEPENDENT MEMORY FOR EACH PAGES (JOB_ID:2, PAGE_ID:44)

| Order_No | Mgmnt_No | Job_ID | Page_ID | Part_ID | HD_ID | SW_ID | CMD_Code | Optr_ID | TIME |
|---|---|---|---|---|---|---|---|---|---|
| 200 | 10002 | 2 | 44 | 2 | 1 | 1 | START :01 | 90 | 93/7/26/2:29:35 |
| 200 | 10002 | 2 | 44 | 2 | 1 | 1 | COMPLT:04 | 90 | 93/7/26/2:51:08 |

FIG. 20

INDEPENDENT MEMORY FOR EACH PROCESS STEPS (H/W ID:1 S/W ID:1)

| Order No | Mgmnt No | Job ID | Page ID | Part ID | HD ID | SW ID | CMD Code | Optr ID | TIME |
|---|---|---|---|---|---|---|---|---|---|
| 200 | 10002 | 2 | 44 | 2 | 1 | 1 | START :01 | 90 | 93/7/26/2:29:35 |
| 200 | 10002 | 2 | 44 | 2 | 1 | 1 | COMPLT :04 | 90 | 93/7/26/2:51:08 |
| 200 | 10002 | 2 | 43 | 31 | 1 | 1 | START :01 | 100 | 93/7/26/3:24:14 |
| 200 | 10002 | 2 | 43 | 31 | 1 | 1 | COMPLT :04 | 100 | 93/7/26/3:40:00 |

FIG. 21

INDEPENDENT MEMORY FOR EACH PROCESS STEPS (H/W ID:2 S/W ID:15)

| Order No | Mgmnt No | Job ID | Page ID | Part ID | HD ID | SW ID | CMD Code | Optr ID | TIME |
|---|---|---|---|---|---|---|---|---|---|
| 200 | 10002 | 2 | 43 | 30 | 2 | 15 | START :01 | 0150 | 93/7/26/2:28:35 |
| 200 | 10002 | 2 | 43 | 30 | 2 | 15 | COMPLT :04 | 0150 | 93/7/26/2:39:01 |

FIG. 22

INDEPENDENT MEMORY FOR EACH PROCESS STEPS (H/W ID:12 S/W ID:01)

| Order_No | Mgmnt_No | Job_ID | Page_ID | Part_ID | HD_ID | SW_ID | CMD_Code | Optr_ID | TIME |
|---|---|---|---|---|---|---|---|---|---|
| 100 | 10001 | 1 | 2 | 12 | 12 | 01 | START   :01 | 0212 | 93/7/26/2:24:00 |
| 100 | 10001 | 1 | 2 | 12 | 12 | 01 | INTRPT  :02 | 0212 | 93/7/26/2:28:30 |
| 100 | 10001 | 1 | 2 | 12 | 12 | 01 | RESTART :03 | 0212 | 93/7/26/2:29:00 |
| 100 | 10001 | 1 | 2 | 12 | 12 | 01 | INTRPT  :02 | 0212 | 93/7/26/2:31:30 |
| 100 | 10001 | 1 | 2 | 12 | 12 | 01 | RESTSART:03 | 0212 | 93/7/26/2:40:00 |
| 100 | 10001 | 1 | 2 | 12 | 12 | 01 | COMPLT  :04 | 0212 | 93/7/26/2:50:14 |

FIG. 23

INDEPENDENT MEMORY FOR EACH PROCESS STEPS (H/W ID:67 S/W ID:93)

| Order_No | Mgmnt_No | Job_ID | Page_ID | Part_ID | HD_ID | SW_ID | CMD_Code | Optr_ID | TIME |
|---|---|---|---|---|---|---|---|---|---|
| 100 | 10001 | 1 | 2 | 13 | 67 | 93 | START  :01 | 0213 | 93/7/26/3:01:00 |
| 100 | 10001 | 1 | 2 | 13 | 67 | 93 | COMPLT :04 | 0213 | 93/7/26/3:10:00 |

FIG. 25

PRIMARY TOTALIZATION FILE OF TIME MANAGEMENT INFORMATION (FOR EACH JOBS)

| Job_ID | Page_ID | Parts_ID | H/W_ID | S/W_ID | Operator_ID | T(net)$_k$ | T(Iidle)$_k$ | T(pidle)$_k$ |
|---|---|---|---|---|---|---|---|---|
| 0001 | 0002 | 0012 | 12 | 01 | 00212 | 17:14 | 9:00 | 10:46 |
| 0001 | 0002 | 0013 | 67 | 93 | 00213 | 9:00 | 0:00 | 13:00 |
| 0001 | 0002 | 0014 | 12 | 50 | 00214 | 10:00 | 0:00 | — |

FIG. 26

ACTUAL RESULT INFORMATION FILE

| JOB Code | T(total net) | T(total idle) | T(total time) |
|---|---|---|---|
| 0001 | 36:14 | 32:46 | 69:00 |

PROCESS MANAGEMENT APPARATUS AND METHOD FOR A PREPRESS PROCESS STORING PROGRESS STATUS DATA SEGMENTED INTO JOB UNITS AND PROCESS STEPS OF JOB PROGRESS

This application is a continuation of application Ser. No. 08/298,288 filed Aug. 31, 1994, now abandoned.

BACKGROUND OF THE INVENTION

1. Field of the Invention

The present invention relates to a process management apparatus for prepress process and a method for management of prepress process.

2. Description of the Prior Art

FIG. 1 illustrates a diagram of a process management apparatus which is disclosed in U.S. Pat. No. 4,682,286. Respective apparatuses 20, 22, 24, 26, 28, 30, and 32 are connected with a common bus 4 through respective terminal 6, 8, 10, 12, 14, 16 and 18. Also, shared memory 2 is connected with the common bus 4. Progress status data from the respective terminal 6 to 18 is stored in the shared memory 2 successively. In the respective terminal 6 to 18, the progress status data stored in the shared memory 2 is read out, then necessary progress status data is searched and classified in accordance with a desired purpose such as each job classification. As a result of this, it is possible to grasp the progress status according to the desired purpose (for example, by each job).

However, above described prior art has following problems to resolve. The progress status data is stored in the shared memory 2 successively. Therefore, when an operator tries to grasp the progress status according to the desired purposes, seeking and classification of the data is need to be carried out, so that speed of processing is not fast enough. Especially, when many of the apparatuses are connected to the process management apparatus, the speed of processing is more slow.

SUMMARY OF THE INVENTION

It is an object of the present invention to provide a process management apparatus for prepress process and a method for management of prepress process which realizes management of progress status promptly.

A process management apparatus for prepress process connected with forming a network to plural of equipment apparatuses for prepress process comprising:

a) receiving means for receiving progress status data from each of the equipment apparatuses;

b) segment means for segmenting the progress status data received by the receiving means in accordance with purpose of processing;

c) memory means having memory groups grouped by purpose of processing, the each memory groups having memory areas for each segment in accordance with purpose of processing, and the memory means storing the progress status data segmented by the segment means to each corresponding memory areas of each memory groups; and d) a processing means for carrying out processing by reading out the progress status data from the each memory area of the memory area group in accordance with given purpose of processing.

A method for process management of prepress process carrying out by connecting a process management apparatus for prepress process with forming a network to the plural of apparatuses for prepress process, comprising the steps of:

a) step for receiving the progress status data from each apparatuses;

b) step for segmenting the received progress status data in accordance with purpose of processing;

c) step for storing segmented progress status data to each corresponding memory areas of each memory area groups, the memory area groups being prepared for purpose of processing and each memory area groups having each memory areas for each segments in accordance with purpose of processing; and d) step for carrying out processing by reading out the progress status data from each memory area of the memory area group in accordance with given purpose of processing.

While the novel features of the invention are set forth in a general fashion, both as to organization and content, will be better understood and appreciated, along with other objections and features thereof, from the following detailed description taken in conjunction with the drawings.

BRIEF DESCRIPTION OF THE DRAWINGS

FIG. 9 is a view illustrating a structure of the job master file.

FIG. 10 is a view illustrating a structure of parts data master file.

FIG. 11 is a view illustrating a correspondence table for hardware identification number, software identification number, name of apparatus, and name of software.

FIG. 14 is a view illustrating a structure of progress status data.

FIG. 16 is a view illustrating an example of progress status data which is received by the management apparatus 42.

FIGS. 17 to 19 are views illustrating progress status data stored in the independent memory for each pages.

FIGS. 20 to 23 are views illustrating progress status data for stored in the independent memory for each process steps.

FIG. 25 is a view illustrating a result of totalization of progress status data for each pages.

FIG. 26 is a view illustrating a table for result of the final totalization of progress status data for each pages.

DESCRIPTION OF THE PREFERRED EMBODIMENT

While, in the present invention, apparatuses for prepress process are the apparatuses which are understood in a broad sense, and include apparatuses for design which makes prepress job instruction or the like during the design process, that is previous process of prepress process. Also, the apparatuses for prepress process include apparatuses for proof read to confirm with the result of the prepress, and further include each apparatus constitute DTP (Desk Top Publishing) which is recently getting wide spread.

Figure 3:
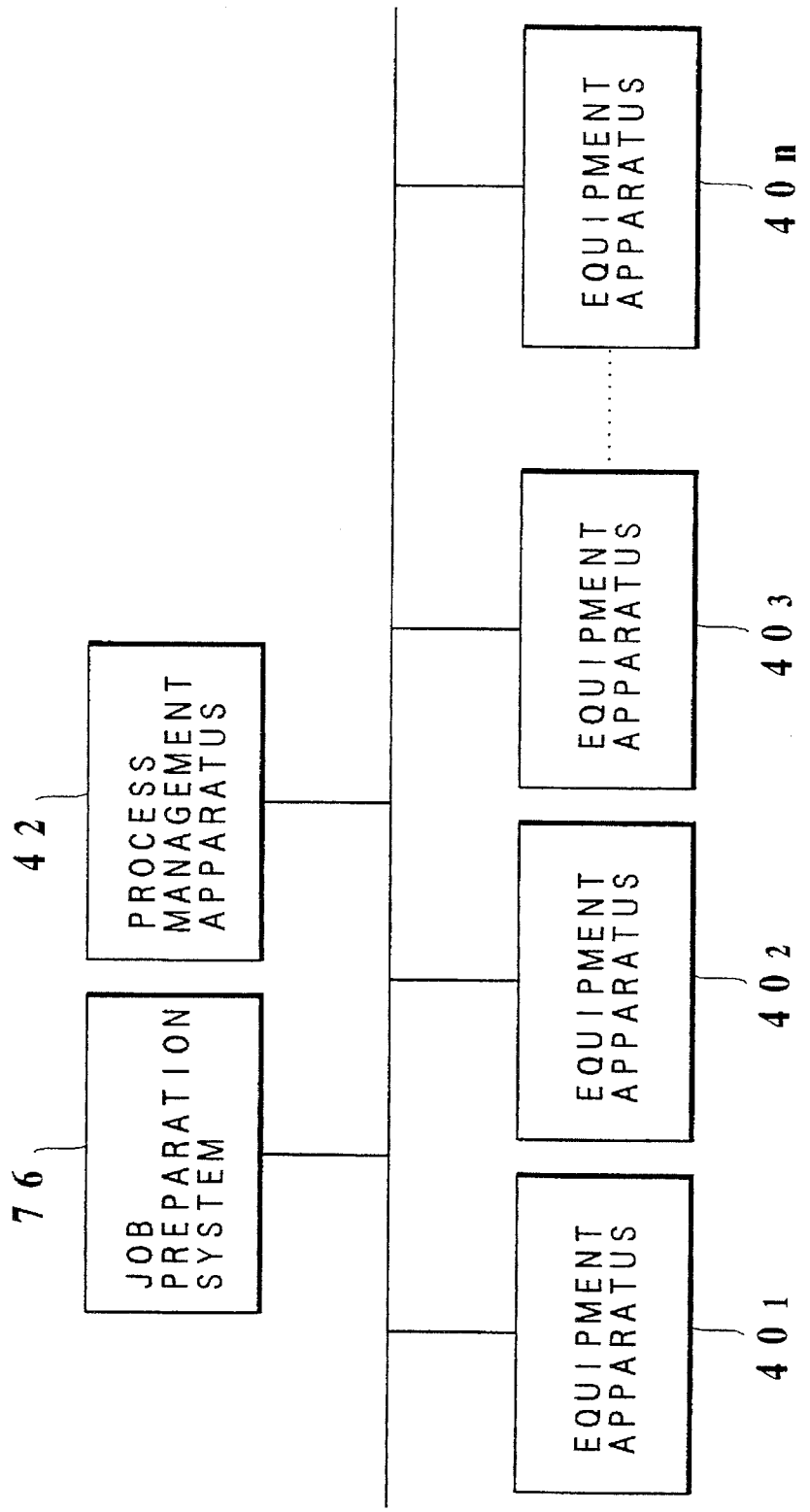
FIG. 3 is a view illustrating a block diagram of prepress system utilizing the process management apparatus 42 shown in FIG. 2.

FIG. 3 illustrates a block diagram of prepress system includes a process management apparatus for prepress process by utilizing one example of the present invention. In the system, equipment apparatuses 40$_1$ 40$_2$, 40$_3$ . . . 40$_n$ (input scanner, output scanner, simplified proof read apparatus, workstation or the like for each image processing such as retouch or layout which is utilized in prepress process, is connected with each other in forming a network. Further, the process management apparatus for prepress process (hereinafter referred as the management apparatus) 42 and a job preparation system 76 are connected with the equipment apparatuses described above in forming a network.

Figure 1:
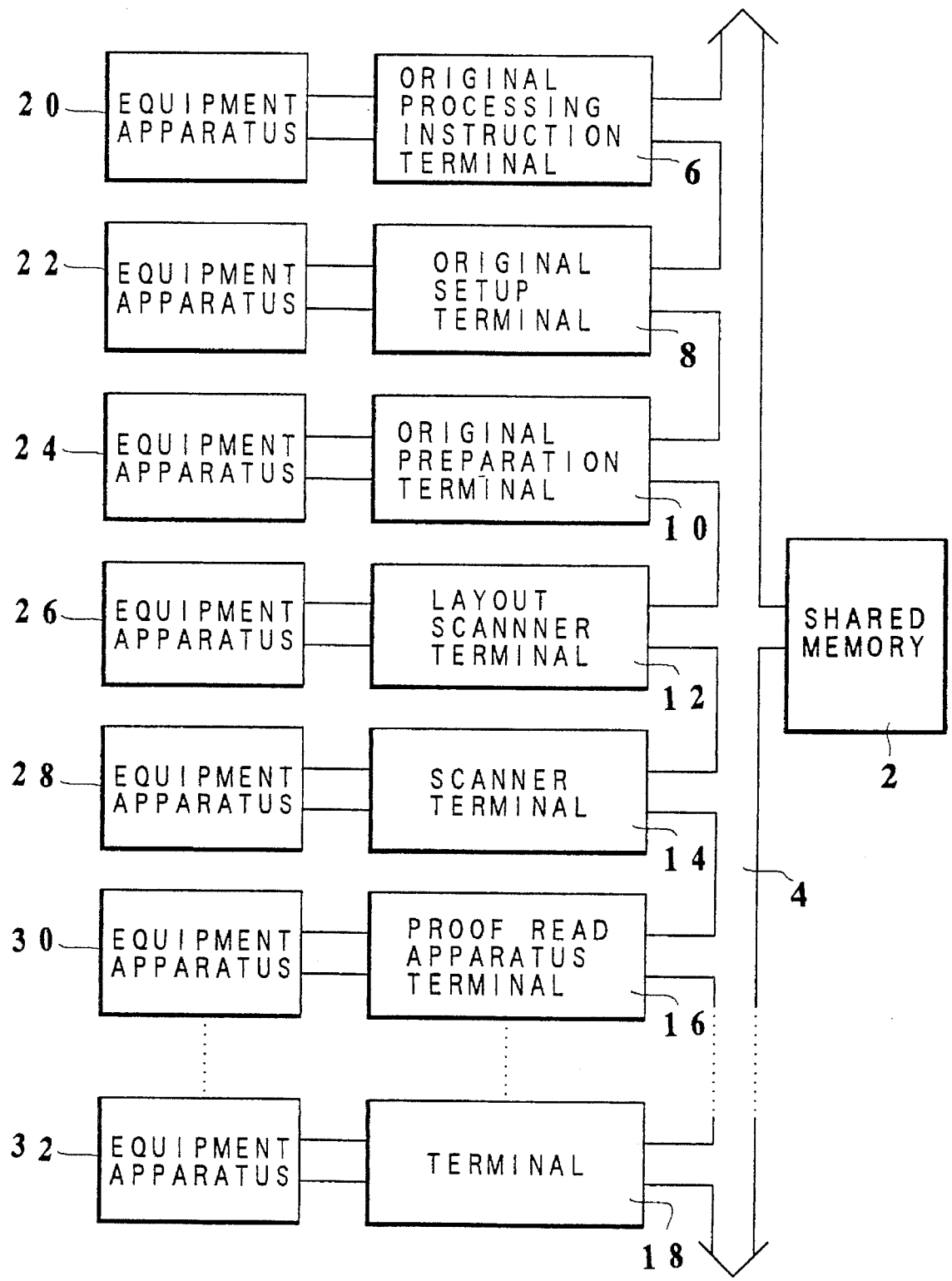
FIG. 1 is a diagram illustrating a conventional process management apparatus.
Figure 2:
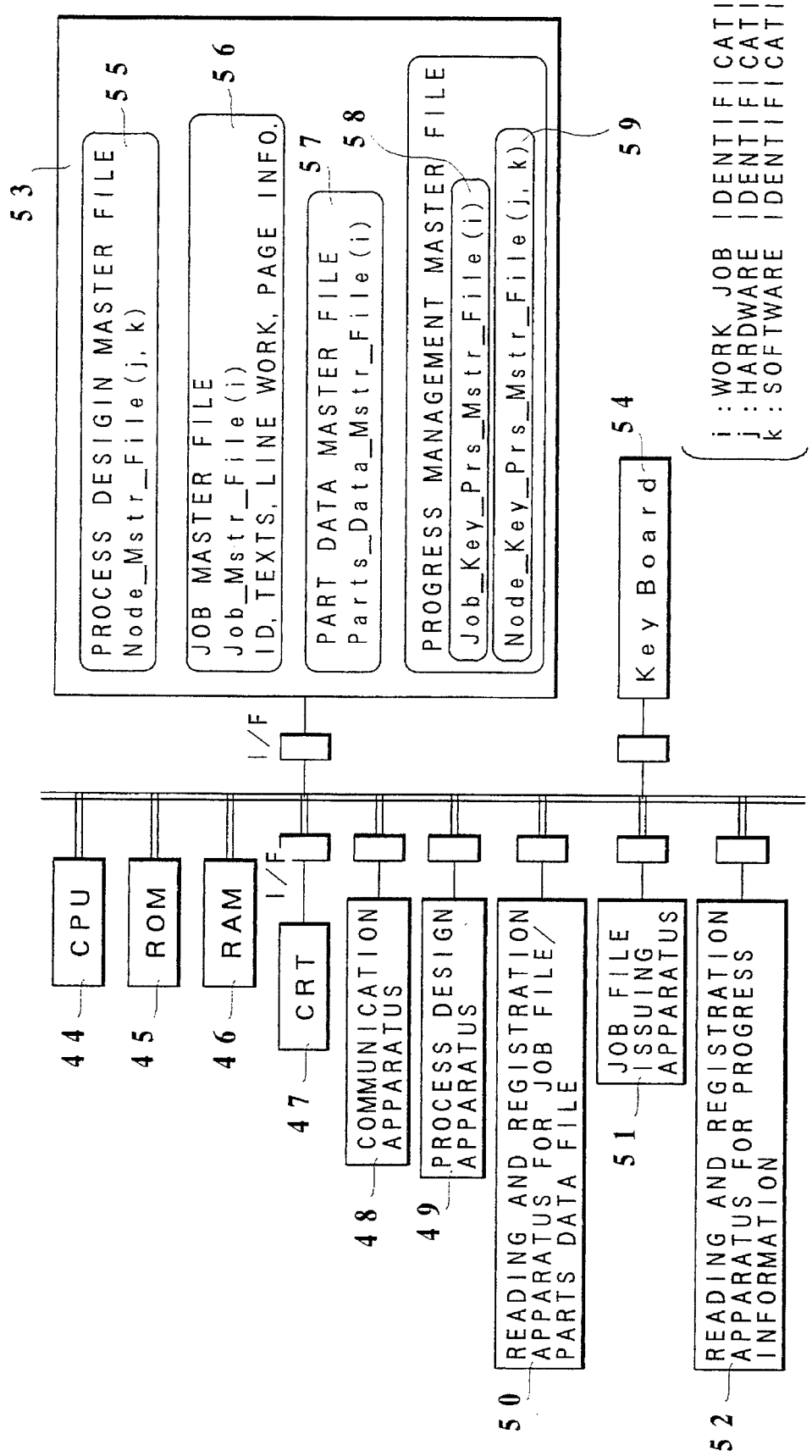
FIG. 2 is a view illustrating a block diagram of one embodiment for process management apparatus 42 for prepress process in the present invention.

FIG. 2 illustrates a block diagram of the management apparatus 42. The management apparatus 42 comprises CPU 44, ROM 45 and RAM 46. The management apparatus further comprises CRT 47 for display, communication apparatus 48, process design apparatus 48, reading and registration apparatus 50 for job file/parts data file, job file issuing apparatus 51, reading and registration apparatus 52 for progress information act as a segment means, disk 53 as a memory means and keyboard 54. On the disk 53, process design master file 55, job master file 56, parts data master file 57, job key master file 58 act as a memory area group for each jobs and Node key master file 59 as a memory area group for each job kinds are stored. The management apparatus 42 is able to communicate with the equipment apparatuses 40$_1$ to 40$_n$ in exchanging the progress status data by the communication means 48 which acts both as a receiving means and a transmission means.

Figure 4:
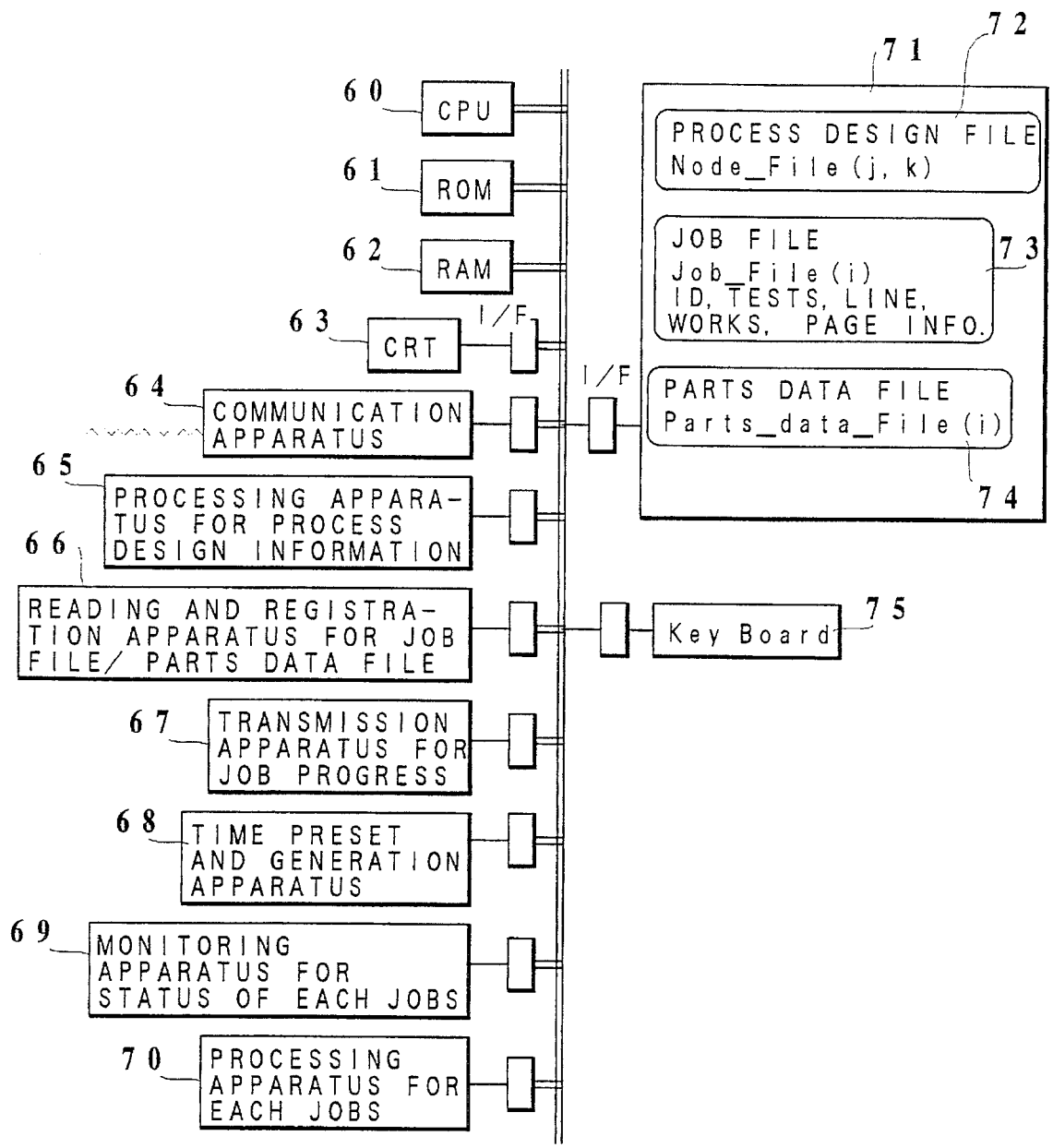
FIG. 4 is a view illustrating a block diagram of apparatuses 40 (40₁ to 40ₙ) in the prepress system shown in FIG. 2.

FIG. 4 illustrates a block diagram of the equipment apparatus 40. The equipment apparatus 40 comprises CPU 60, ROM 61 and RAM 62. The apparatus 40 further comprises CRT 63 for display, communication apparatus 64, processing apparatus 65 for process design information, reading and registration apparatus 66 for job file/parts data file, transmission apparatus 67 for job progress information, time preset and generation apparatus 68, monitoring apparatus 69 for status of each jobs, processing apparatus 70 for each jobs, disk 71, and keyboard 75. On the disk 71, process design file 72, job file 73 and parts data file 74 are stored.

Figure 5:
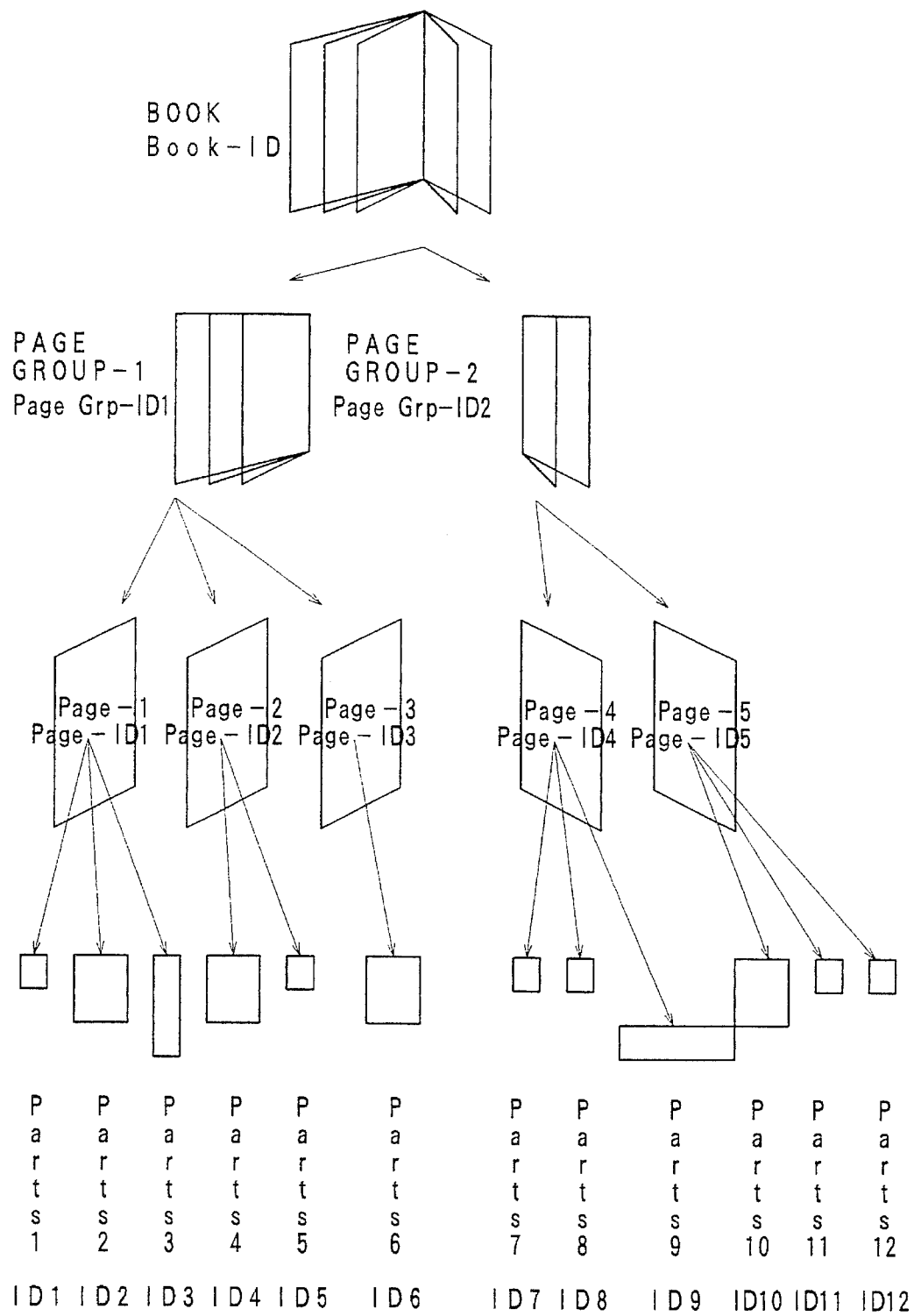
FIG. 5 is a view illustrating an example of structure for the prepress work.

Management of the progress status for the prepress process with utilizing the management apparatus 42 of above systems will be described. Here, a prepress work for a book constituted in FIG. 5 is used as an example for the explanation. The book is divided into two parts such as the first half (page group-1) and the second half (page group-2). Further, the first half and the second half are divided into each pages. The each pages consists of one job step.

Figure 6:
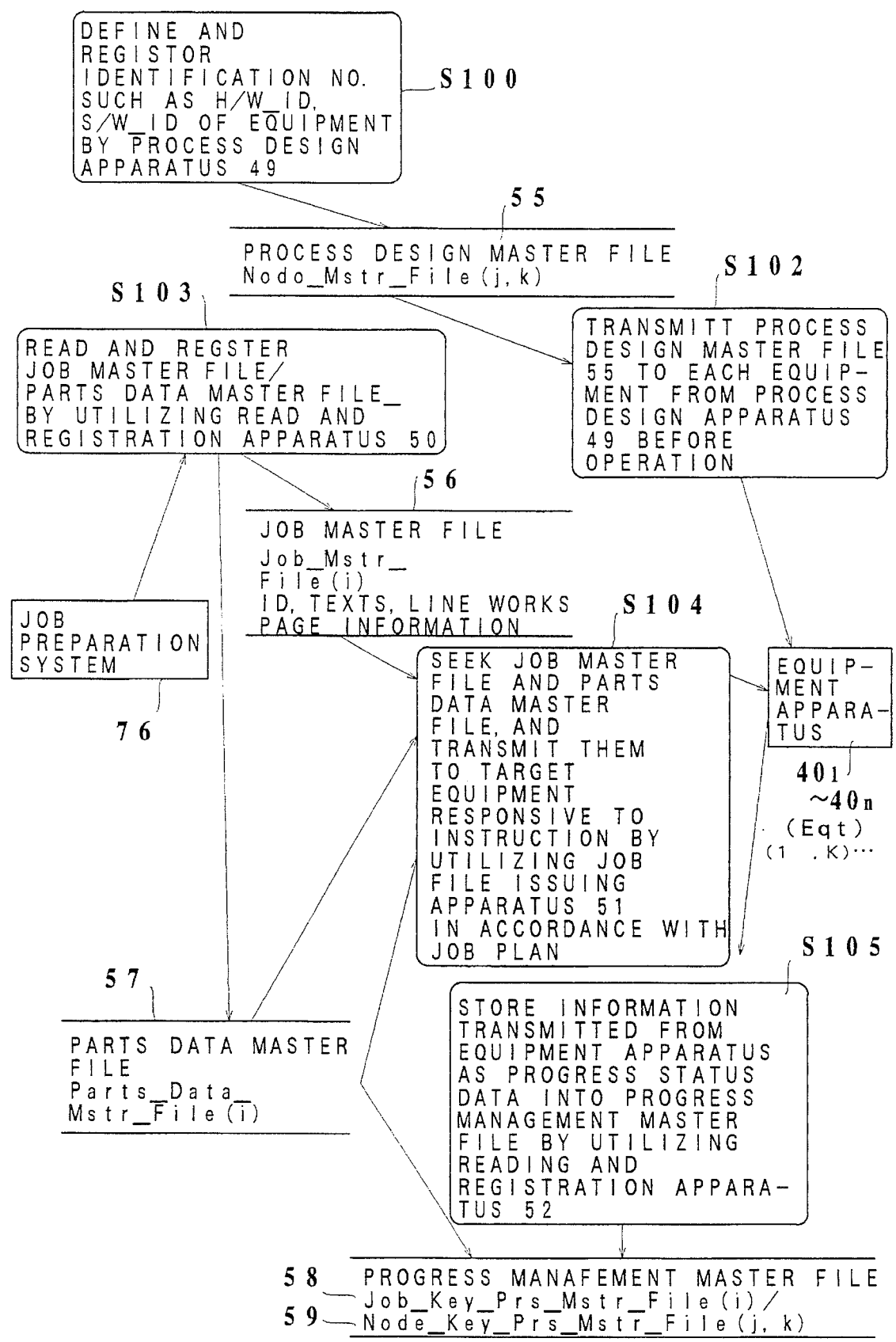
FIG. 6 is a view illustrating a processing of the management apparatus 42.
Figure 7:
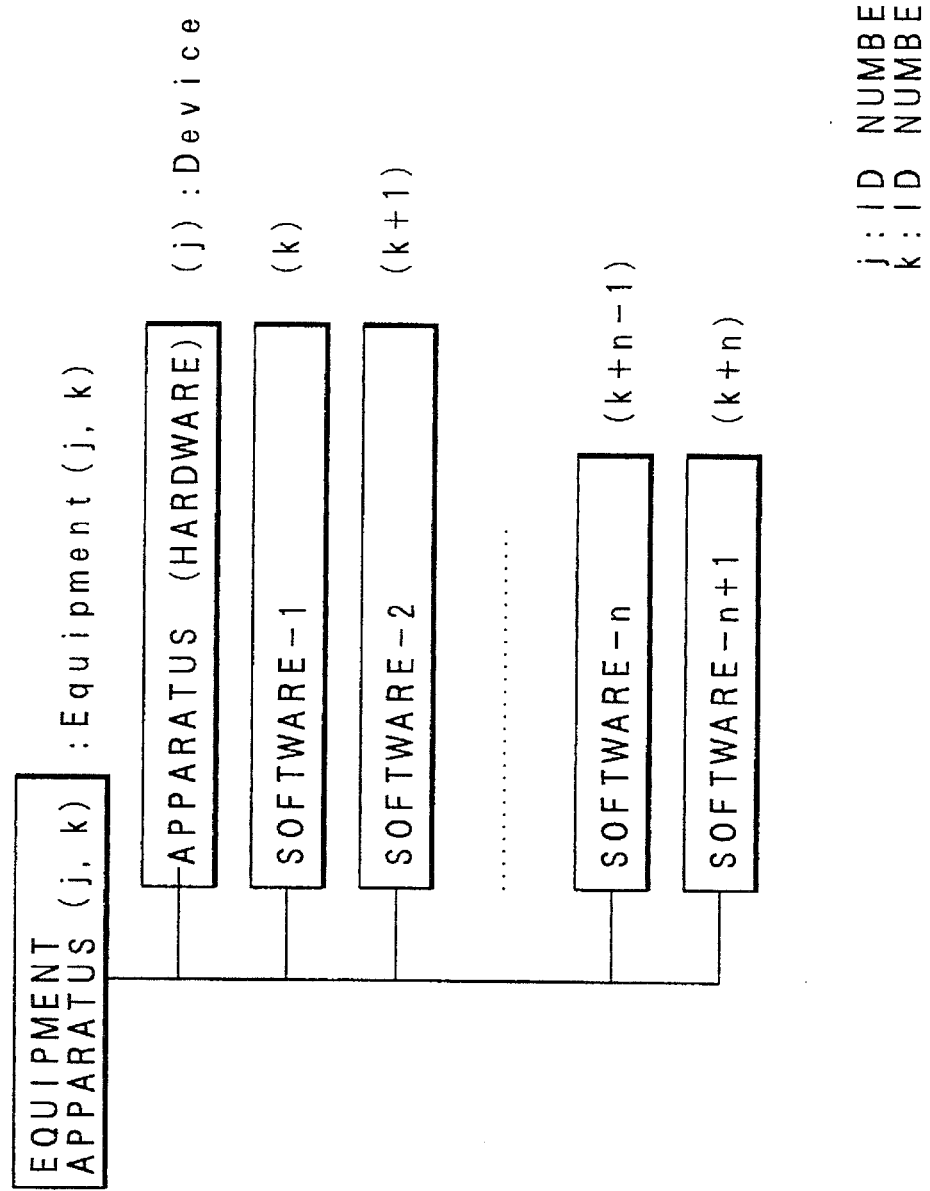
FIG. 7 is a view illustrating a relationship between the identification numbers of the apparatuses (hardware) and the software.

FIG. 6 illustrates a flow chart of prepress work and process management. Initially, hardware identification number H/W ID of the apparatus 40$_1$ to 40$_n$ and software identification number S/W ID are defined and then registered by using the process design apparatus 49 of the management apparatus 42 (step S100). FIG. 7 illustrates an example of how to provide the identification numbers. An identification number of hardware as j is provided to the hardware of the equipment apparatus 40. Identification number of software k, k+1, . . . k+n are provided respectively to various software applicable to the equipment apparatuses. So that, when indicating a certain process, it can be specified by identifier (j,k). Thereupon, process design master file 55 of "Node Matr File(j,k)" is prepared and stored on the disk 53.

Subsequently, the process design master file 55 is transmitted to each of the equipment apparatuses 40$_1$ to 40$_n$ from the process design apparatus 49 through the communication apparatus 48 (step S102).

On the other hand, the job master file 56 and the parts data master file 57 are read out from the job preparation system 76 which is connected with a network, by utilizing the reading and registration apparatus 50 for job file/parts data file, and are registered (step S103).

The job master file 56 of "Job Mstr File(i)" clarifies a relationship between each page as job step and the parts utilizing therein as shown in FIG. 9, (Refer to page identification number "Page ID", parts identification number "Parts ID"). Also, the job master file 56 of "Job Mstr File(i)" includes information which clarifies each page belongs to which part of job construction shown in FIG. 5 (such as work job identification number "Job ID", book level identification number "Book ID", page group identification number "Page Grp ID") or the like. While, the job master file 56 of "Job Mstr File(i)" is made of a group of job (for instance, a job which makes several number of books as a series). In other words, the job master file 56 of "Job Mstr File(i)" is made for each work job identification number "Job ID").

The parts data master file 57 of Parts Data Mstr File(i)" is also made for each work job identification number "Job ID". As shown in FIG. 10, the parts data master file 57 of "Parts Data Mstr File(i)" clarifies a relationship between parts identification number "Parts ID" which is utilized in the job, and stored address "Parts Data Address" of the parts data. For example, it is understood that parts data of the parts identification number "text-126" is stored in to the address "100012" of the parts data file 74. While, here, the parts data is a data which includes text data linework data, and image (picture) data which constitutes a page.

The job master file 56 and the parts data master file 57 in above structure are stored on the disk 53.

Figure 8:
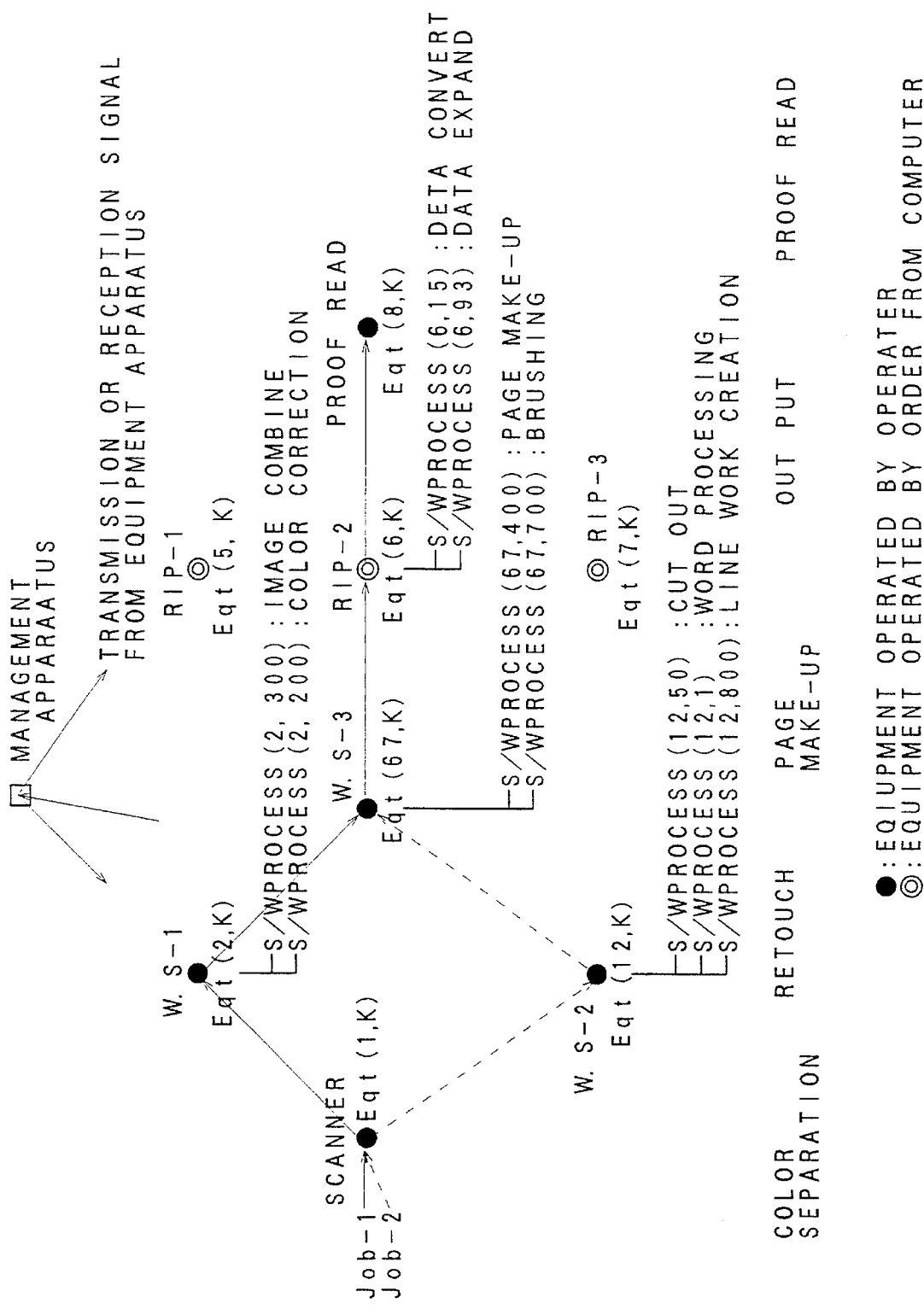
FIG. 8 is a view illustrating a job plan in the prepress process.

Next, job plan is made as shown in FIG. 8 and FIG. 11. In FIG. 8, Eqt represents equipment apparatus. For instance, Eqt(1,k) represents scanner and Eqt(2,k) represents a workstation for image processing. Moreover, software utilizing in the workstation Eqt(2,k) are indicated as S/W process (2,300) of image combine and S/W process (2,200) of color correction. This means that both the software for image combine and the software for color correction are used in the workstation Eqt(2,K). While, the hardware identification number provided to each equipment apparatuses, and the software identification number provided to each softwares are defined in step S100 (Refer to FIG. 7). Also, FIG. 11 shows a corresponding relationship between hardware identification number and the software identification number.

Now, back to FIG. 6, required job master file 56 and required parts data master file 57 are selected from the disk 53 and transmitted to the each of the equipment apparatuses by utilizing the job file issuing apparatus 51 and the communication apparatus 48 (step S104). Thus, required data to be used for the job is sent to the each of the equipment apparatuses. In other words, preparation for the job is ready.

Figure 12:
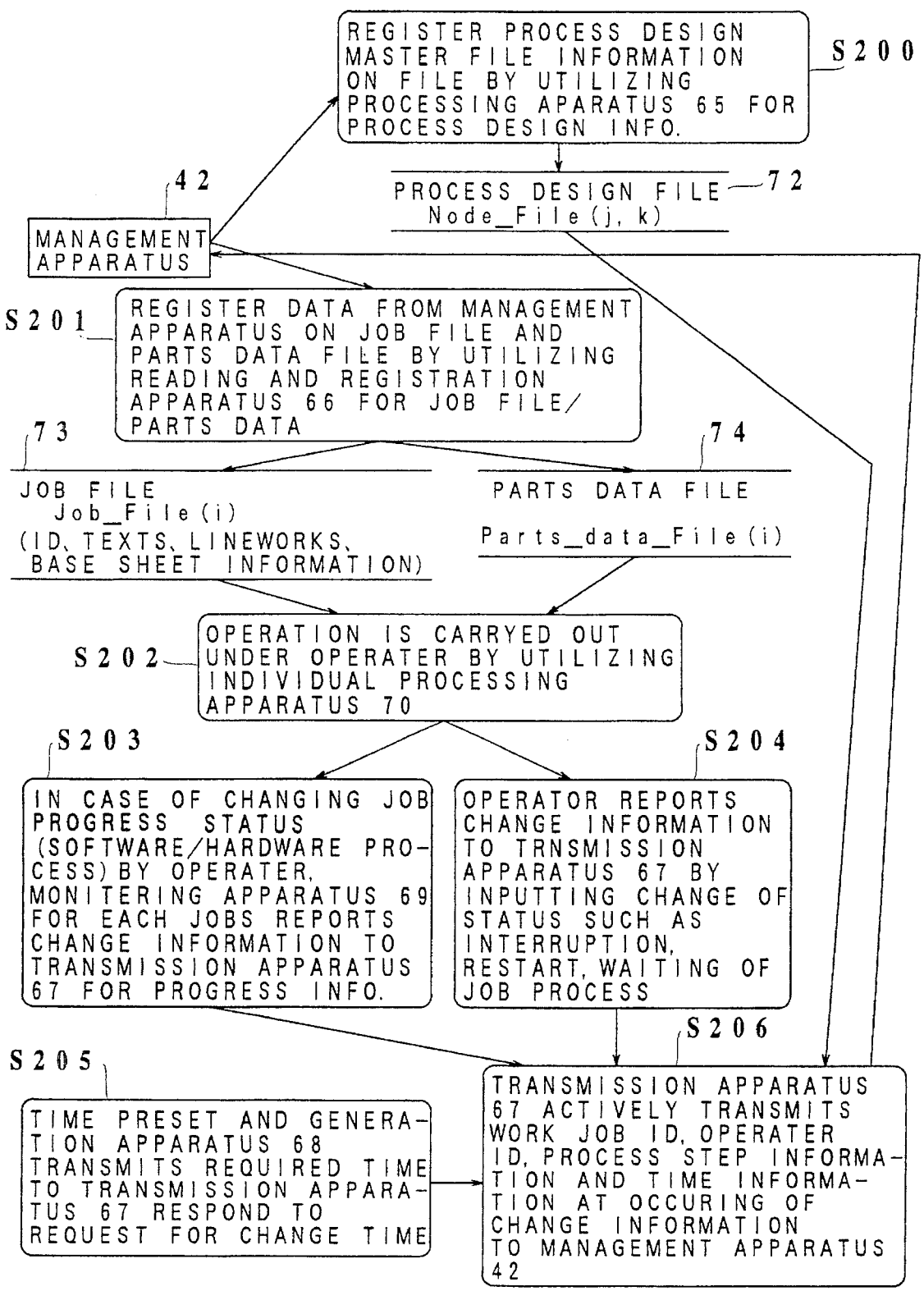
FIG. 12 is a view illustrating processes of the apparatuses which an operator operates.

FIG. 12 shows the above operation observed from the equipment apparatuses until preparation for the job is ready. Once the equipment apparatus receives the process design master file 55 of "Node Mstr File(J,k)" from the management apparatus 42, information which is necessary for the equipment apparatus is extracted by the processing apparatus 65 for process design information (Refer to FIG. 4), and a process design master file 72 of "Node File(j,k)" is generated. Then the process design master file 72 is stored on the disk 71 (Refer to FIG. 4) (FIG. 12, Step S200).

In a similar manner, upon receipt of the job master file 56 "Job Matr File(i)" and the parts data master file 57 "Parts Data Mstr File(i)" both transmitted from the management apparatus 42, information which is necessary for the equipment apparatus is extracted by the reading and registration apparatus 66 for job file/parts data file, both the Job file 73 "Job File(i)" and parts data file 74 "Parts Data File(i)" are generated. Next, the job file 73 "Job File(i)" and the parts data file 74 "Parts Data File(i)" are stored on the disk 71 (Refer to FIG. 4) (FIG. 12, Step S201).

Figure 13:
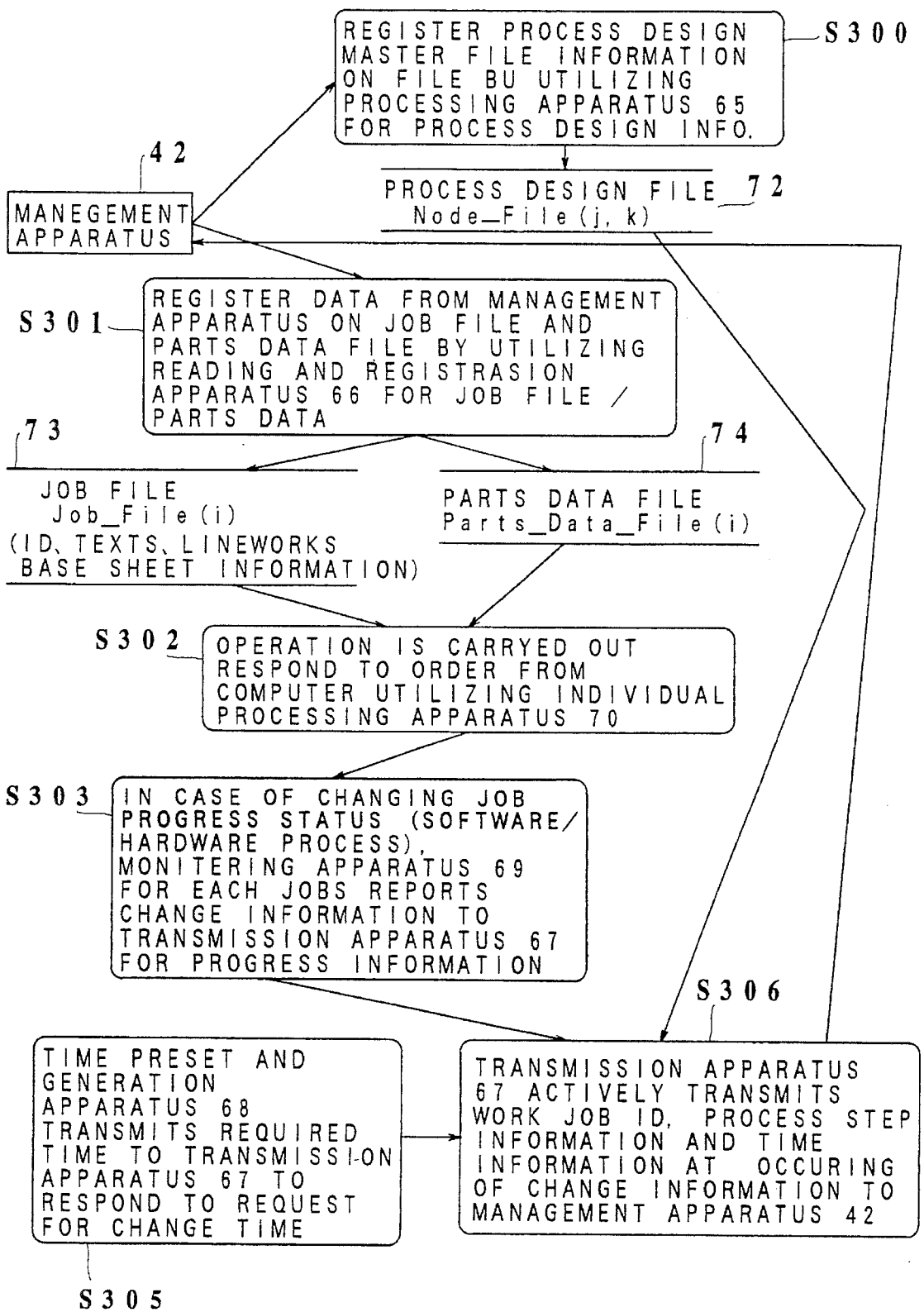
FIG. 13 is a view illustrating processes of the apparatuses during the automatic operation.

While, there are two types of equipment apparatuses, one is operated by an operator, the other one is operated automatically by a command from the management apparatus 42 without any operator. FIG. 12 shows a flow chart of the equipment apparatus which is operated by the operator. Although the flow chart of the equipment apparatuses operated automatically is shown in FIG. 13, operation to complete the ready for jobs (step S300 to S301) are identical to FIG. 12.

As disclosed in above, preparation for the job is completed at both the management apparatus 42 and the apparatuses 40₁ to 40ₙ (Eqt), the operation starts at each of the apparatus 40₁ to 40ₙ (Eqt). At first, operation of the equipment apparatus operated by the operator is described with referring to FIG. 12. The operation of each equipment apparatuses is carried out at each of the equipment apparatuses by utilizing processing apparatus 70 for individual jobs (Refer to FIG. 4) (Step S202). For instance, when the equipment apparatus is a scanner for input, image reading is carried out. Also, when the equipment apparatus is the workstation for image processing, provided job (image combine, color correction, cutting out or the like) is carried out (Refer to FIG. 8).

At the same time, monitoring apparatus 69 for status of each jobs of each equipment apparatuses detects change of process status, such as start or finish of the operation by on or off state of start switch and stop switch (in case of using software, the equipment apparatus detects the change by starting or stopping to run the software) or the like. Once the change is detected, the monitoring apparatus 69 for status of each jobs transmits the change to the transmission apparatus 67 for job progress information (FIG. 12, step S203).

Upon receipt of information for the change, the transmission apparatus 67 for job progress information send a request for time transmission to the time preset and generation apparatus 68, then receiving the time when the transmission apparatus 67 received information for the change (step S205). Next, the transmission apparatus 67 for job progress information send hardware identification number "H/W ID", software identification number "S/W ID" and time "Time" or the like with the work job identification number "Job ID" and the page identification number "Page ID" or the like which is processed when the change occurs, to the management apparatus 42 through the communication apparatus 64 (step S206). FIG. 14 shows a progress status data transmitted by the transmission apparatus 67 for job progress information.

While, when the operator interrupts the job with holding the operation of the apparatuses, the operator input the interrupts information (step S204). In this case, information for the change is sent to the transmission apparatus 67 for job progress information and the progress status data shown in FIG. 14 is transmitted to the management apparatus 42 as disclosed above.

Subsequently, operation of the equipment apparatus which is operated automatically in accordance with a command from the management apparatus 42 is shown in FIG. 13. For such apparatus, an apparatus (RIP: Raster Image Processor) which carries out data conversion and data expansion as shown in FIG. 8 is applicable. In case of the apparatus operated automatically, the monitoring apparatus 69 for status of each jobs outputs the information for change as a result of monitoring the change of job status with a processing (step S302), and then upon receipt of the information, the apparatus 67 for job progress information outputs the progress status data shown in FIG. 13 (step S303, S305, S306).

As disclosed in above, the progress status data is transmitted to the management apparatus 42 from the each of the equipment apparatuses 40₁ to 40ₙ (Eqt). While, in this embodiment, the progress status data are retrieved not by polling from each equipment apparatuses 40₁ to 40ₙ to the management apparatus 42, instead, each of the equipment apparatuses 40₁ to 40ₙ actively transmits the data to the management apparatus 42. Therefore, the progress status data are able to transmitted under real-time bases.

Figure 15:
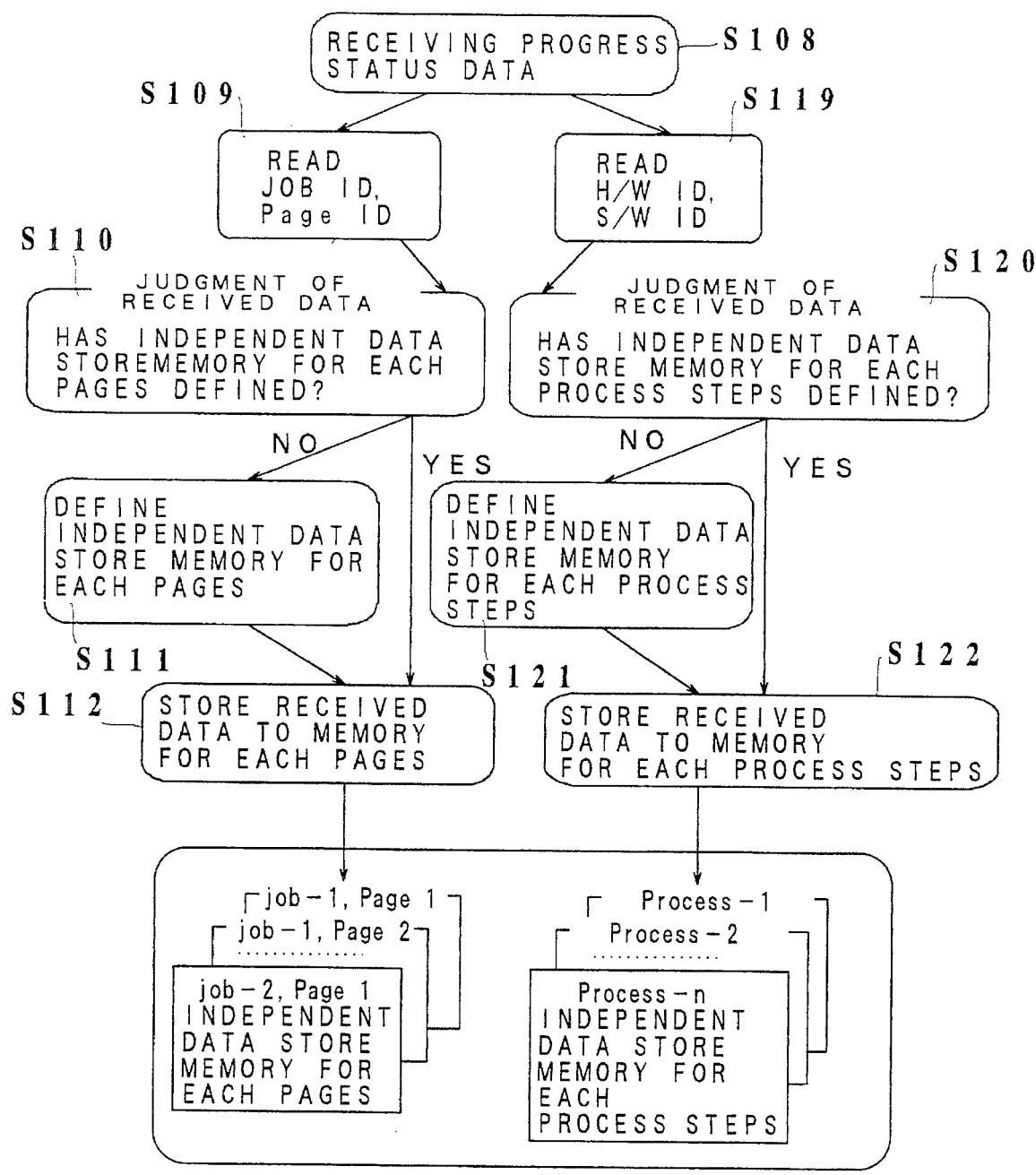
FIG. 15 is a view illustrating processes of the reading and registration apparatus for progress information.

Next, processing at the management apparatus 42 which receives the progress status data is described to based on FIG. 6. In the management apparatus 42, the progress status data are segmented and stored on the disk by the reading and registration apparatus 52 for progress information (FIG. 2) (step S105). FIG. 15 shows a details of step S105. Also, FIG. 16 shows progress status data which received successively, then arranged in order for time of receiving. Although, the progress status data was stored in order of receiving in an apparatus of prior art, in the present invention, the progress status data is segmented into each job and each job kinds and then stored as disclosed below.

In FIG. 15, upon receipt of the progress data (step S108), first, work job identification number "Job ID" and page identification number "Page ID" are read (step S109). Further, judgement is carried out whether or not independent memory for data storing (memory area) for each pages (as each jobs) has already been defined or not in accordance with the work job identification number "Job ID" and the page identification number "Page ID" (step S110). If the definition has not been carried out, the independent memory for data storing (memory area) for the page is defined in the "Job Key Prs Mstr File(i)" 58 as progress management master file (step S111). Consecutively, the progress status data is stored in the defined areas (step S112).

FIG. 17, FIG. 18 and FIG. 19 show the progress status data thus stored for each pages in the progress master file on the disk 53. FIG. 17 shows a progress status data of "work job identification number: 1, page identification number: 2", FIG. 18 shows a progress status data of "work job identification number: 2, page identification number: 43", and FIG. 19 shows a progress status data of "work job identification number: 2, page identification number: 44".

While, in this embodiment, each memory areas (independent memory for data storing) is formed for each page units as each job units. This is due to carry out progress status management for each page units. So that, each memory areas (independent memory for data storing) for each job units, such as, each of the work job identification number or each of the page group in correspond with purpose of progress status management. Also, the work job unit corresponding to the memory area (independent memory for data storing) may be both of each page units and each page group units in correspond with purpose for processing.

As disclosed above, the progress status data are to be stored for each job kinds (in this embodiment, for each process steps), with storing the progress status data for each page units. Now, back to FIG. 15, first, the hardware identification number "H/W ID" and the software identification number "S/W ID" are read from the progress status data (step S119). Further, judgement is carried out whether or not the independent memory for data storing (memory areas) for each process steps as job kinds has already been defined or not in accordance with the hardware identification number "H/W ID" and the software identification number "S/W ID" (step S120). If the independent memory for data storing (memory areas) has not been defined, the independent memory for data storing (memory areas) for each process steps is defined in the "Node Key Prs Mstr File(i)" 59 as a progress management master file (step S121). Continuously, the progress status data is stored in the defined areas (step S122).

FIG. 20, FIG. 21, FIG. 22, and FIG. 23 show the progress status data thus stored for each process steps in the progress master file in the disk 53. FIG. 20 shows a progress status data of "hardware identification number: 1, software identification number: 1", FIG. 21 shows a progress status data of "hardware identification number: 2, software identification number: 15", FIG. 22 shows a progress status data of "hardware identification number: 12, software identification number: 1", and FIG. 23 shows a progress status data of "hardware identification number: 67, software identification number: 93".

While, in this embodiment, each memory area (independent memory for data storing) is formed for each softwares as an unit. This is due to carry out progress status management for each softwares. It may form each memory area (independent memory for data storing) for each functions in the software or for each hardwares as each job steps, in correspond with purpose of the progress status management. Also, the job step corresponding to the memory area (independent memory for data storing) may be both of those unit in correspond with purpose for processing.

As disclosed above, the memory area for each pages and for each process steps is formed in the progress management master file in the disk 53, and the progress status data is stored by the read and registration apparatus 52 for progress information. While, whole memory area for each page is referred as memory area group 58 for each jobs (FIG. 2), and whole memory area for each process steps is referred as memory area group 59 for each job kinds (FIG. 2).

Since, the progress status data is stored for each pages and for each process steps, the process to grasp the progress status can be carried out promptly. For instance, to understand net operation time, idle time during a process for a page, and idle time during a process between other page, following calculation may be carried out. CPU 44 reads out progress status data relate with a target page (here, page 2 of job identification number: 1). In other wards, data is read out from the independent memory for data storing shown in FIG. 17. At that time, since the progress status data has already been stored independently for each pages, it is not necessary to carry out seek, so that reading is realized promptly.

Figure 24:
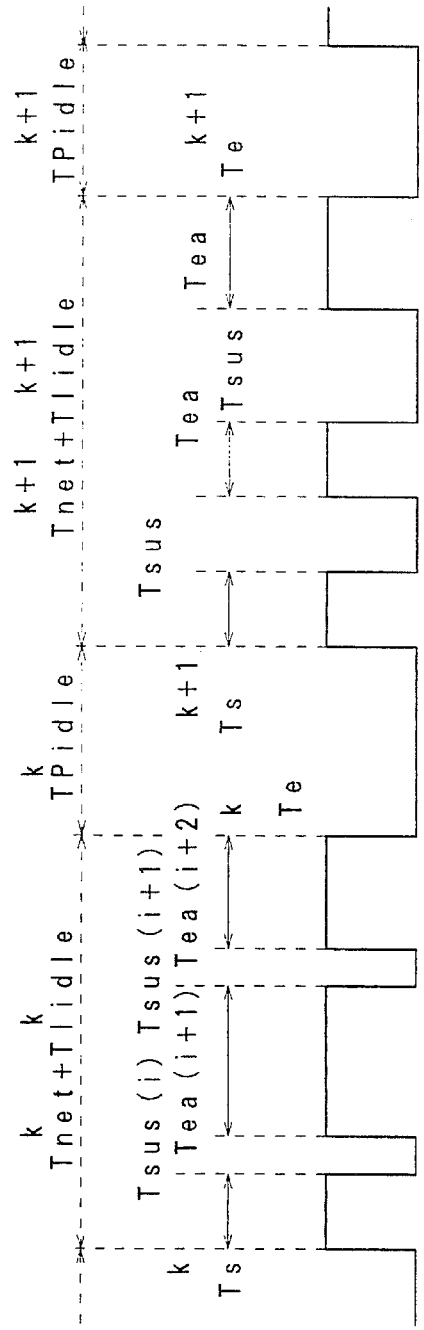
FIG. 24 is a view illustrating a method for calculation of totalization processing for progress management for each pages.

Subsequently, net operation time "T(net)k", loss time in process "T(Iidle)k", and loss time between process "T(Pidle)k" are calculated at each processes of the page in accordance with the progress status data. FIG. 24 shows a calculation method, and FIG. 26 illustrates a obtained result from the calculation. Further, once the calculation results are totalized, the net operation time "T(net)k", the loss time in process "T(Iidle)k", and the loss time between process "T(Pidle)k" of the page are obtained as shown in FIG. 25. It is possible to manage a progress in prepress process to display the calculated result in a graph or the like on the CRT 47 (FIG. 2).

While, in this embodiment, when the independent memory for data storing for each page or for each process step are not exist, then these are to be defined and stored. So that, in case of occurrence for magnification during the process, it is possible to carry out progress management in certain degree. Because the identification number is given for each software, it is possible to carry out progress management in certain degree even when the software is used in unexpected equipment apparatuses.

In the process management apparatus for prepress process and a method for prepress process of this invention, the progress status data is segmented and stored in accordance with purpose of processing in advance, prompt processing can be realized when grasp of progress status, so that, in case of connecting many of the equipment apparatuses, speed of processing does not decrease.

In the process management apparatus for prepress process of this invention, memory area is formed for each jobs or for each job kinds. Therefore, it is possible to carry out progress management in accordance with for each jobs or each job kinds promptly.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A process management apparatus connected in a network with a plurality of prepress devices for a prepress process of a printing operation, said apparatus comprising:

receiving means for receiving, in real time, progress status data including information concerning change of job progress for each of said plurality of prepress devices, said information concerning change of job progress including start times and end times of job units and process steps of said job progress;

segment means for segmenting said progress status data received by said receiving means into said job units and said process steps of said job progress in accordance with a prescribed purpose of processing;

memory means having memory groups respectively corresponding to said job units and said process steps of said job progress, each said memory group having a plurality of memory areas, each of said memory areas of said memory groups corresponding to each of said job units and said process steps, respectively, said memory means storing said progress status data segmented by said segment means to each said corresponding memory area of said each memory group with respect to each of respective said job units and said process steps; and processing means for carrying out processing by reading out said progress status data from said each memory areas of said each memory group with respect to each of respective said corresponding job units and process steps; and wherein said each of said plurality of prepress devices comprises means for detecting said change of said job progress and for transmitting, in real time, said progress status data including information concerning said change of said job progress to said receiving means.

2. The process management apparatus for a prepress process in accordance with claim 1, wherein said receiving means receives the progress status data with job identifier number.

3. The process management apparatus for a prepress process in accordance with claim 1, wherein said progress status data includes information of start time and end time of a software job and a hardware job.

4. A method of process management for a process management apparatus connected in a network with a plurality of prepress devices for a prepress process of a printing operation, said process management apparatus including memory means having memory groups respectively corresponding to job units and process steps of job progress for said plurality of prepress devices, each said memory group having a plurality of memory areas, each said memory areas of said memory groups corresponding to each of said job units and said process steps, respectively, said method comprising the steps of:

receiving, in real time progress status data including information concerning change of job progress for each of said plurality of prepress devices, said information concerning change of job progress including start times and end times of job units and process steps of said job progress;

segmenting said progress status data received by said receiving means into said job units and said process steps of said job progress in accordance with a prescribed purpose of processing;

storing the segmented said progress status data to each said corresponding memory area of said each memory group with respect to each of respective said job units and said process steps; and carrying out processing by reading out said progress status data from said each memory area of said each memory group with respect to each of respective said corresponding job units and process steps; and wherein said each of said plurality of prepress devices comprises means for detecting said change of said job progress and for transmitting, in real time, said progress status data including information concerning said change of said job progress to said receiving means.

5. The method of process management in accordance with claim 4, wherein said step of receiving progress status data includes receiving progress status data with job identifier number.

6. The method of process management in accordance with claim 4, wherein said progress status data includes information of start time and end time of a software job and a hardware job.

* * * * *